United States Patent
Haldar et al.

(10) Patent No.: US 11,687,385 B2
(45) Date of Patent: Jun. 27, 2023

(54) UNSUPERVISED EVENT EXTRACTION

(71) Applicant: International Business Machines Corporation, Armonk, NY (US)

(72) Inventors: Rajarshi Haldar, Champaign, IL (US); Yu Deng, Yorktown Heights, NY (US); Lingfei Wu, Elmsford, NY (US); Ruchi Mahindru, Elmsford, NY (US); Shu Tao, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 477 days.

(21) Appl. No.: 16/880,556

(22) Filed: May 21, 2020

(65) Prior Publication Data

US 2021/0365306 A1    Nov. 25, 2021

(51) Int. Cl.
| | |
|---|---|
| *G06F 9/44* | (2018.01) |
| *G06F 9/54* | (2006.01) |
| *G06F 40/205* | (2020.01) |
| *G06F 16/38* | (2019.01) |
| *G06N 20/00* | (2019.01) |
| *G06F 16/901* | (2019.01) |
| *G06N 3/088* | (2023.01) |
| *G06F 16/35* | (2019.01) |

(52) U.S. Cl.
CPC .............. *G06F 9/542* (2013.01); *G06F 16/35* (2019.01); *G06F 16/38* (2019.01); *G06F 16/9024* (2019.01); *G06F 40/205* (2020.01); *G06N 3/088* (2013.01); *G06N 20/00* (2019.01)

(58) Field of Classification Search
CPC ...................................... G06F 9/542
USPC ......................................................... 719/318
See application file for complete search history.

(56) References Cited

U.S. PATENT DOCUMENTS

| | | |
|---|---|---|
| 9,703,861 B2 | 7/2017 | Brown et al. |
| 2011/0055699 A1 | 3/2011 | Li et al. |

FOREIGN PATENT DOCUMENTS

| | | |
|---|---|---|
| CN | 104133916 B | 1/2019 |
| WO | 2018165932 A1 | 9/2018 |

OTHER PUBLICATIONS

Lenovo, "Battery does not charge past 50% under Windows 8/8.1—ThinkPad X1 Carbon," © 2019 Lenovo, 2 pages, https://support.lenovo.com/us/en/solutions/ht104061.
Wu, et al., "Enriching Pre-trained Language Model with Entity Information for Relation Classification," arXiv:1905.08284v1 [cs.CL] May 20, 2019, 6 pages.
Kipf, "Graph Convolutional Networks," https://tkipf.github.io/graph-convolutional-networks/, Sep. 30, 2016, 8 pages.

(Continued)

*Primary Examiner* — Timothy A Mudrick
(74) *Attorney, Agent, or Firm* — Amin, Turocy & Watson, LLP

(57) ABSTRACT

Computer-implemented techniques for unsupervised event extraction are provided. In one instance, a computer implemented method can include parsing, by a system operatively coupled to a processor, unstructured text comprising event information to identify candidate event components. The computer implemented method can further include employing, by the system, one or more unsupervised machine learning techniques to generate structured event information defining events represented in the unstructured text based on the candidate event components.

20 Claims, 12 Drawing Sheets

(56) References Cited

OTHER PUBLICATIONS

Kipf, et al., "Variational Graph Auto-Encoders," arXiv:1611.07308v1 [stat.ML] Nov. 21, 2016, 3 pages.
Frans, "Variational Autoencoders Explained," http://kvfrans.com/variational-autoencoders-explained/, Aug. 6, 2016, 8 pages.
Lenovo, "No audio sound output from external monitor when playing a video file after hot plugging Dock DisplayPort monitor—ThinkPad," © 2019 Lenovo, 2 pages, https://support.lenovo.com/us/en/solutions/sf15-t0084.
Lenovo, "Alternate Drivers for 2014 X1 Carbon GOBI 5000?," © 2019 Lenovo, 11 pages, https://forums.lenovo.com/t5/ThinkPad-X-Series-Laptops/Alternate-Drivers-for-2014-X1-Carbon-GOBI-5000/td-p/1521758.
Lenovo, "GOBI 5000 WWAN card unable to connect to Verizon Wireless under Microsoft Windows 7—ThinkPad," © 2019 Lenovo, 11 pages, https://support.lenovo.com/us/en/solutions/ht081505.

Example AMR Mappings of Predicates to Senses

- Run-01: "operate, proceed"
  - ARG0: Operator
  - ARG1: Machine, Operation, Procedure
  - ARG2: Employer
  - ARG3: Coworker
  - ARG4: Instrumental

— 401

- Run-02: "walk quickly"
  - ARG0: Runner
  - ARG1: Course, race distance
  - ARG2: Opponent

— 402

- Run-03: "cost"
  - ARG1: Commodity
  - ARG2: Price
  - ARG3: Buyer

Unstructured Input Text: "The battery does not charge past 50% under the new operating system on my computer."

503 ⟶

Unstructured Input Text: "The system is plugged into the AC adapter but the battery won't get charged past 50%."

501 →

Unstructured Input Text: "The battery does not charge past 50% under the new operating system on my computer."

503 →

Unstructured Input Text: "The system is plugged into the ac adapter but the battery wont get charged past 50%."

UNSUPERVISED EVENT EXTRACTION

TECHNICAL FIELD

This application relates to event extraction and more particularly to extracting structured event schema from unstructured text using unsupervised machine learning.

SUMMARY

The following presents a summary to provide a basic understanding of one or more embodiments of the present disclosure. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products are described that provide unsupervised event extraction.

According to an embodiment, a system can comprise a memory that stores computer executable components and a processor that executes the computer executable components stored in the memory. The computer executable components comprise a parsing component that parses unstructured text comprising event information to identify candidate event components. In one or more implementations, the parsing component employs abstract meaning representation (AMR) parsing to identify the candidate event components. The computer executable components further comprise an event extraction component that generates structured event information defining events represented in the unstructured text based on the candidate event components. The event extraction component employs one or more unsupervised machine learning techniques to generate the structured event information based on the candidate event components.

In some embodiments, the candidate event components comprise one or more candidate event trigger terms and one or more candidate event arguments respectively associated with the one or more candidate event trigger terms. The computer executable components can further comprise an event representation component that generates one or more event representations based on the candidate event components using graph embeddings. For example, the event representation component can generate the event representations based on the candidate event trigger terms and the one or more candidate event arguments respectively associated therewith. The computer executable components can further comprise a clustering component that employs the one or more event representations to cluster the candidate event components into different event types.

The computer executable components can further include a role labeling component that labels the candidate event arguments with one or more role attributes representative of one or more roles the candidate event arguments play with respect to the different event types. For example, the role labeling component can employ one or more unsupervised machine learning techniques to label the candidate event arguments with the one or more role attributes based on existing semantic relationship data included in one or more external knowledge bases. The event extraction component can further generate the structured event information based on the different event types, the candidate event trigger terms respectively associated with the different event types, the candidate event arguments respectively associated with the candidate event trigger terms, and the one or more role attributes.

In some embodiments, the computer executable components further comprise a query component that receives a query request regarding an event and employs the structured event information to identify one or more parts of the unstructured text comprising information relevant to the query request. With these embodiments, the query component can employ unsupervised event extraction to generate structured query event schema for the query request. The query component can further compare the structured query event schema to the structured event information to identify relevant parts of the unstructured text (e.g., relevant documents) that are annotated with similar structured event schema.

In some embodiments, elements described in connection with the disclosed systems can be embodied in different forms such as a computer-implemented method, a computer program product, or another form.

DESCRIPTION OF THE DRAWINGS

FIG. 4 illustrates examples of AMR mapping of predicates to senses in accordance with one or more embodiments.

DETAILED DESCRIPTION

Figure 1:
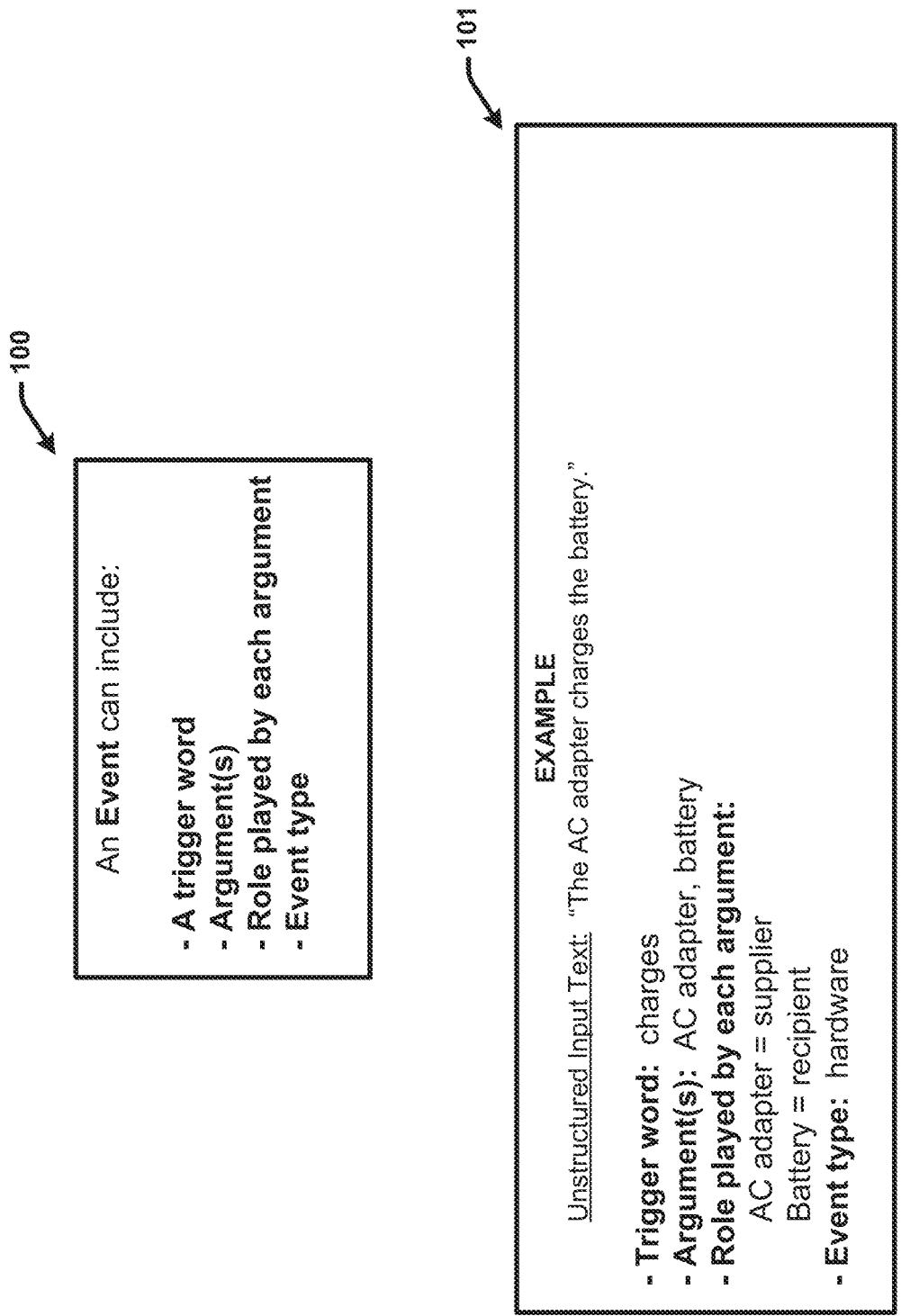
FIG. 1 illustrates example structured event schema for defining events in accordance with one or more embodiments.

The following detailed description is merely illustrative and is not intended to limit embodiments and/or application or uses of embodiments. Furthermore, there is no intention to be bound by any expressed or implied information presented in the preceding Technical Field or Summary sections, or in the Detailed Description section.

With the increasing amount of data and the exploding number of digital data sources, utilizing extracted information in decision making processes becomes increasingly urgent and difficult. One problem is the fact that most data is initially unstructured in a format that loosely implies its meaning and is described using natural, human-understandable language, which makes the data limited in the degree in which it is machine-interpretable. This problem thwarts the automation information extraction processes used for decision making when involving large amounts of data.

The disclosed subject matter is directed to systems, computer-implemented methods, and/or computer program products that perform unsupervised event extraction. In particular, the disclosed subject matter provides techniques for extracting structured event information from unstructured text in a completely unsupervised manner (e.g., without requiring prior knowledge of entity mentions and without requiring annotated datasets). In various embodiments, the structured event information may define an event by at least the following four components: a trigger term/word, one or more arguments, the role played by each argument, and/or the event type. The disclosed unsupervised event extraction techniques involve automatically identifying events by these event components in unstructured text sentences and phrases using unsupervised machine learning techniques.

In one or more embodiments, the unsupervised event extraction process includes initially parsing unstructured text to identify the candidate trigger terms and one or more candidate arguments for the candidate trigger terms. In various embodiments, this initial parsing can be performed using abstract meaning representation (AMR) parsing. Other suitable parsing techniques for identifying the candidate trigger terms and arguments can include, but are not limited to, semantic role labeling parsing, dependency parsing, and similar parsing techniques that seek to understand linguistic meaning by constructing precise mathematical models. Event representations for each candidate trigger term (or, in some embodiments, one or more candidate trigger terms) and its candidate argument(s) are further generated using graph embeddings. The event representations are then used to cluster the event representations into different types of events. One or more external knowledge bases are further used to automatically determine the roles of the candidate argument relative to their trigger terms. These external knowledge bases can include public data sources that provide semantic relationship information between thousands to hundreds of thousands of words (or more) in a domain independent framework. The result of unsupervised event extraction process is the generation of machine-interpretable structured event schema defining the extracted events by their components.

The disclosed unsupervised event extraction techniques can be applied to facilitate automated event extraction and related applications in a variety of domains. For example, the disclosed techniques can be applied to facilitate more accurately answering/responding to unstructured user queries for which the correct answers/responses are provided in one or more unstructured text documents/files. In one example use case, the disclosed techniques can be applied to facilitate answering user queries related to information technology (IT) questions/problems. In this regard, in dialog and search applications on IT problems, often user queries contain entity like components, along with an observation. For instance, an example IT related user query may state that their device "battery does not charge past 50% under the new operating system on my computer".

To semantically understand and answer such user queries, the system needs domain knowledge on components (entities), their state and their semantic relations. Such knowledge is typically embedded in the domain content such as troubleshooting documents. In accordance with this example, the disclosed unsupervised event extraction techniques can be used to automatically extract such domain knowledge from the troubleshooting documents for reasoning and disambiguation in order to narrow down a user's problem to a targeted component and related state. For example, unsupervised event extraction can be used to generate structured event schema for all potential events included in the troubleshooting documents. The structured event schema can also include or otherwise be associated with information that identifies the specific part (or parts) of the troubleshooting documents describing or otherwise related to each (or in some implementations one or more) extracted event. For example, assuming the troubleshooting documents include different documents or excerpts directed to different IT problems, the different documents/excerpts can be annotated with structured event schema defining the events (e.g., IT issues) that are described in each document/excerpt.

After the event schema for the troubleshooting documents has been developed, it can be used to answer user queries by reasoning using events. For example, the system can convert an unstructured user query into structured query event schema using the same (or similar) unsupervised event extraction process used to generate the event schema for the troubleshooting documents. The system can then screen the query event schema against the event schema for the troubleshooting documents to identify one or more related events (e.g., based on having same or similar event components). The portion or portions of the troubleshooting documents corresponding to the related events (e.g., specific documents, links to documents or the like) can be returned to the user as query results. In some implementations in which more than one relevant document or excerpt of the troubleshooting documents are identified, the query results can rank the relevant documents/excerpts of the troubleshooting documents based on degree of correspondence (e.g., best match to lowest match).

It should be appreciated that this example use case in IT domain support is merely one example and the disclosed unsupervised event extraction techniques can be applied to many different domains to extract event schema from unstructured data sources in a computationally efficient, cost effective, and automated (e.g., without manual annotation and supervised learning involvement) manner. For example, the disclosed unsupervised event extraction techniques can be applied to extract events from dynamic news messages (e.g., published in new articles and reports, blogs, social media forums, etc.) in a real-time manner to enhance the performance of personalized news systems as news messages can be selected more accurately, based on user preferences and identified topics (or events). Furthermore, events extracted using the disclosed unsupervised event extraction techniques can be useful in risk analysis applications, monitoring systems, and decision-making support tools. The disclosed unsupervised event extraction techniques can also be applied in the medical domain to extract medical or biological events like molecular events from corpora. Various other suitable applications are envisioned.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

FIG. 1 illustrates example, structured event schema 100 for defining events in accordance with one or more embodiments. The structured event schema 100 can define an event by one or more event components and the disclosed unsupervised event extraction techniques can involve automatically identifying events in unstructured text sentences and phrases by the defined event components. In various embodiments, the structured event schema 100 can define an event by four components, which include a trigger word (or term), one or more arguments, the role played by each argument, and the event type. In some embodiments, an event can be defined by one, two or three of these four components. In other embodiments, additional event components (in addition to the four described above) can be used to define an event.

Box 101 provides an example as applied to extracting events in the IT domain. In the example shown in box 101, the unstructured input text states "The AC adapter charges the battery." In accordance with the disclosed unsupervised event extraction techniques, the structured event schema for this unstructured input text would identify the word "charges" as the trigger word. The unstructured input text further includes two objects or entities mentioned related to the trigger word, which include the AC adapter and the battery. These two terms or words are classified as arguments. Each of these arguments also have different roles relative to the trigger word. In this case, the role of the AC adapter is that of a "supplier" and the role of the battery is that of a "recipient." Extracted events are further grouped or classified by type, which in this example is considered a "hardware" type of event.

Figure 2:
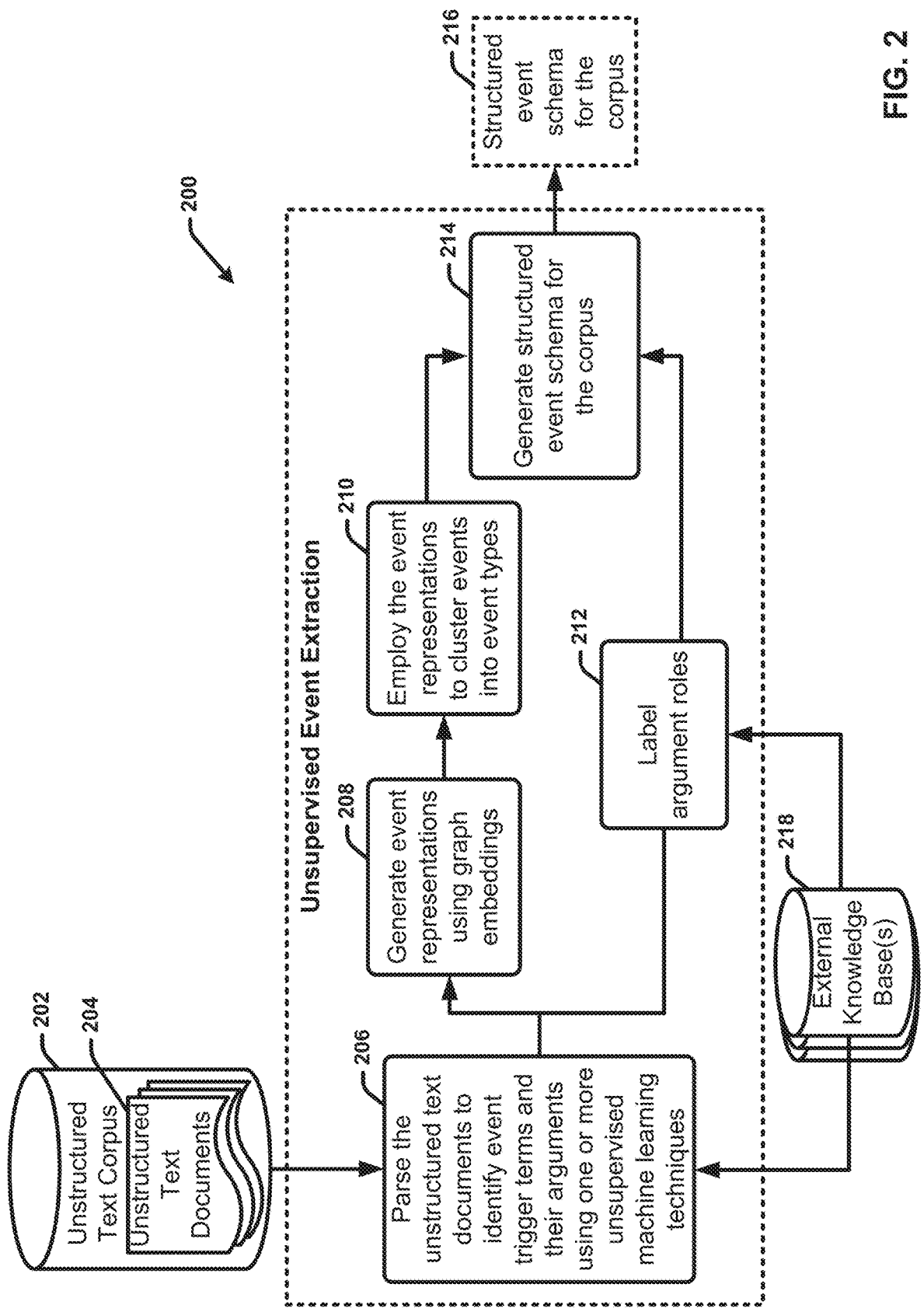
FIG. 2 illustrates a high-level flow diagram of an example, non-limiting unsupervised event extraction process in accordance with one or more embodiments.

FIG. 2 illustrates a high-level flow diagram of an example, non-limiting unsupervised event extraction process in accordance with one or more embodiments. The unsupervised event extraction process 200 provides a high-level, computer-implemented process that can be used to generate structured event schema defining all (or in some implementations one or more) potential events represented in a corpus of unstructured text (i.e., unstructured text corpus 202). In various embodiments, the unstructured text corpus 202 can be or correspond to a collection of unstructured text documents 204 directed to a particular body of domain knowledge. For example, in one implementation, the unstructured text corpus 202 can include an IT corpus that includes unstructured troubleshooting documents related to IT support. In accordance with this example, the troubleshooting documents can include various documents written in natural, human-readable language text providing IT symptoms, possible tests, root causes and resolution, and the like. The unstructured text corpus 202 and the unstructured text documents 204 can be embodied in various suitable data structures and data sources.

In accordance with unsupervised event extraction process 200, at 206 a system operatively coupled to a processor (e.g., system 300 described below or another suitable system), can parse the unstructured text documents 204 to identify event trigger terms and their arguments using one or more unsupervised machine learning techniques. For example, the system can parse the unstructured text documents to identify trigger terms and their arguments in distinct text segments or groupings, such as document titles, sub-titles, individual sentences, individual phrases and the like. This initial parsing can be performed using one or more semantic parsing techniques that employ one or more mathematical models configured to understand linguistic meaning in text and perform event schema induction. In various embodiments, this parsing can include AMR parsing. Other suitable parsing techniques for identifying the candidate trigger terms and arguments can include semantic role labeling parsing, dependency parsing, and the like.

For example, in some implementations, the system can employ AMR parsing and one or more external knowledge bases 218 to facilitate identifying the event trigger terms and their arguments. The one or more external knowledge bases 218 can include one or more public, computational linguistics data sources that provide semantic relationship information between thousands to hundreds of thousands of words (or more) in a domain independent framework. For example, the external knowledge bases 218 can include, but are not limited to: PropBank, VerbNet, Word Sense, WordNet, FrameNet, AMR Bank, BabelNet, and the like. Additional details regarding the initial parsing and identification of the event trigger terms and their arguments are described infra with reference to FIG. 3 and parsing component 306.

At 208, the system can generate event representations for the trigger terms and their arguments(s) using graph embeddings. The graph embeddings can contain the information for the trigger terms' contexts in the sentences or phrases from which they were extracted (i.e., the surrounding nodes in the tree). In various embodiments, the graph embeddings can also be generated using one or more unsupervised machine learning techniques. Additional details regarding the generation of the event representations using the graph embeddings are described infra with reference to FIG. 3 and event representation component 308.

At 210, the system can employ the event representations to cluster events into event types. For instance, some example even types in the IT support domain can include, events related to online issues (e.g., event type="online"), events related to hardware issues (e.g., event types="hardware"), events related to security issues (e.g., event type=security), and the like. In various embodiments, the event type clustering also may be accomplished using one or more unsupervised machine learning techniques. Additional details regarding using the event representations to cluster the events into event types are described infra with reference to FIG. 3 and clustering component 310.

At 212, the system can label the argument roles. In particular, for each (or in some implementations one or more) trigger word, the system can determine the roles that the trigger word's argument(s) have relative to the trigger word in the context of the sentence or phrase from which they were derived (e.g., the roles of supplier and recipient for the AC adapter and the battery respectively in the example described above with reference to box 101). In various embodiments, the argument role labeling may be accomplished using one or more unsupervised machine learning techniques and information provided by the one or more external knowledge bases 218. The argument role labeling is independent of the event representation generation and event type clustering processes. In this regard, the argument role labeling can be performed in parallel (e.g., concurrently) with the event representation and event type clustering processes which adds to the computational efficiency of unsupervised event extraction process 200. Additional details regarding the argument role labeling are described infra with reference to FIG. 3 and the role labeling component 312.

At 214, the system can generate structured event schema for the corpus 216 that defines events in the unstructured text corpus 202. In this regard, the system can organize and index the event components extracted and determined using the unsupervised event extraction process to define distinct events for all (or in some implementations one or more) trigger terms. For example, for each trigger term, the system can generate structured event schema that identifies its arguments, the roles of its arguments, and its event type. In this regard, the result of unsupervised event extraction process 200 is the generation of machine-interpretable, structured event schema for the corpus (i.e., the unstructured text corpus 202) defining all (or in some implementations one or more) extracted events by their four components. In various embodiments, the structured event schema for the corpus 216 can also include or otherwise be associated with information that identifies the specific unstructured text documents or parts of the unstructured text documents corresponding to each extracted event.

Figure 3:
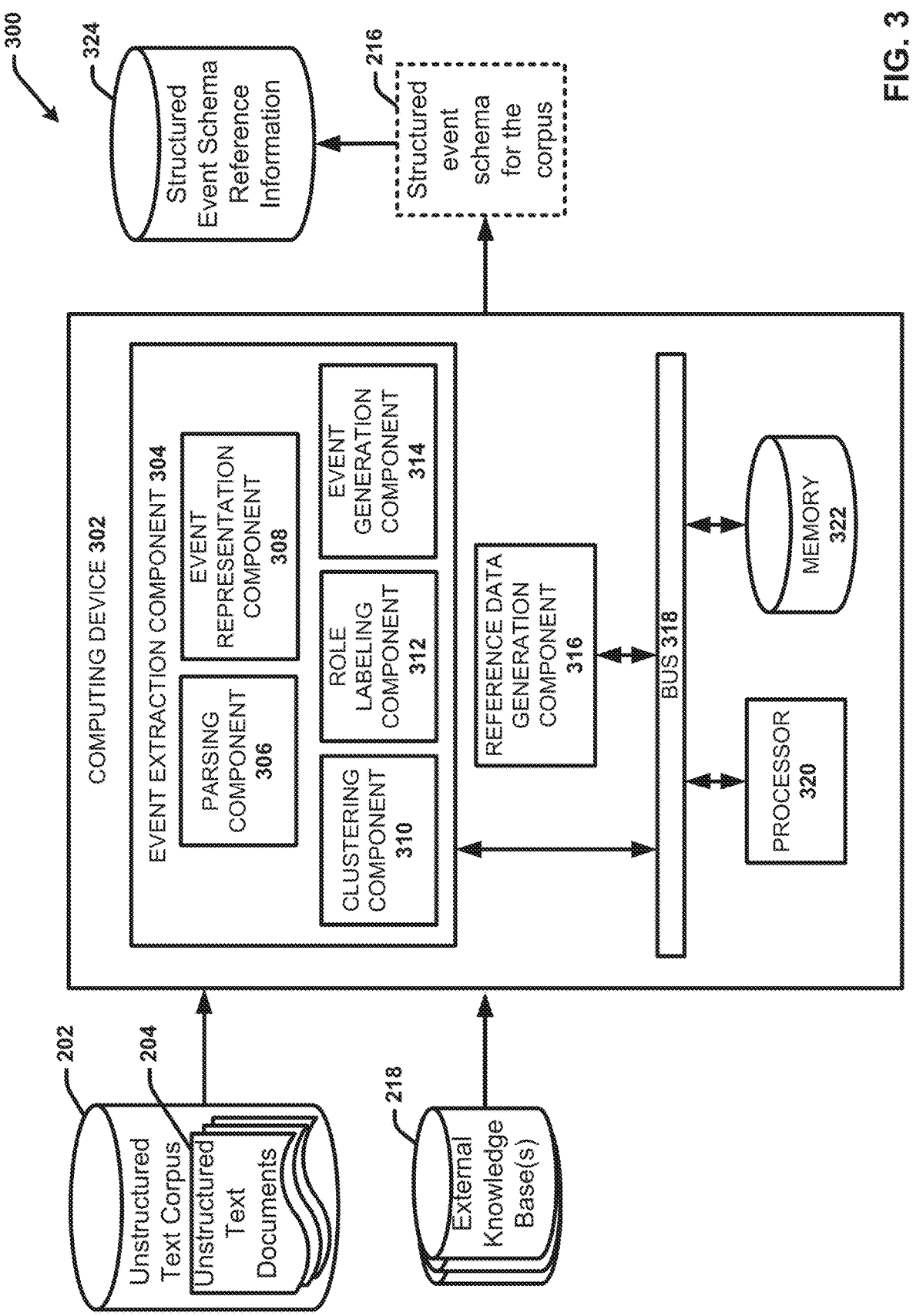
FIG. 3 illustrates a block diagram of an example, non-limiting system that facilitates performing unsupervised event extraction in accordance with one or more embodiments.

FIG. 3 illustrates a block diagram of an example, non-limiting system 300 that facilitates performing unsupervised event extraction in accordance with one or more embodiments. Repetitive description of like elements employed in respective embodiments is omitted for sake of brevity.

Embodiments of systems described herein can include one or more machine-executable components embodied within one or more machines (e.g., embodied in one or more computer readable storage mediums associated with one or more machines). Such components, when executed by the one or more machines (e.g., processors, computers, computing devices, virtual machines, etc.) can cause the one or more machines to perform the operations described. For example, in the embodiment shown, system 300 includes a computing device 302 that includes event extraction component 304 and reference data generation component 316. The event extraction component 304 further includes parsing component 306, event representation component 308, clustering component 310, role labeling component 312 and event generation component 314. All of the components and additional components described herein can respectively be or correspond to machine or computer executable components.

The computing device 302 can further include or be operatively coupled to at least one memory 322 and at least one processor 320. In various embodiments, the at least one memory 322 can store executable instructions (e.g., provided by the event extraction component 304, the parsing component 306, the event representation component 308, the clustering component 310, the role labeling component 312, the event generation component 314 and the reference data generation component 316) that when executed by the at least one processor 320, facilitate performance of operations defined by the executable instructions. In some embodiments, the memory 322 can also store one or more of various data sources and/or structures of system 300 (e.g., the unstructured text corpus 202 and/or the structured event schema reference information 324 database). In other embodiments, the various data sources and data structures of system 300 can be stored in other memory of one or more remote devices or systems that are accessible to the computing device 302 (e.g., via one or more networks). The computing device 302 can further include a device bus 318 that communicatively couples the various components of the computing device 302. Examples of the processor 320 and memory 322, as well as other suitable computer or computing-based elements, can be found with reference to FIG. 12 with respect to processing unit 1216 and system memory 1214, and can be used in connection with implementing one or more of the systems or components shown and described in connection with FIG. 1 or other figures disclosed herein.

System 300 also includes various electronic data sources and/or data structures comprising information that can be read by, used by and/or generated by the event extraction component 304 and/or the reference data generation component 316. For example, these data sources and/or data structures can include (at least one) unstructured text corpus 202, the one or more external knowledge bases 218, and structured event schema reference information 324 database.

In some embodiments, computing device 302 can comprise any type of component, machine, device, facility, apparatus, and/or instrument that comprises a processor and/or can be capable of effective and/or operative communication with a wired and/or wireless network. All such embodiments are envisioned. For example, the computing device 302 can comprise a server device, a computing device, a general-purpose computer, a special-purpose computer, a tablet computing device, a handheld device, a server class computing machine and/or database, a laptop computer, a notebook computer, a desktop computer, a cellular phone, a smart phone, a consumer appliance and/or instrumentation, an industrial and/or commercial device, a digital assistant, a multimedia Internet enabled phone, a multimedia player, and/or another type of device.

It should be appreciated that the embodiments of the subject disclosure depicted in various figures disclosed herein are for illustration only, and as such, the architecture of such embodiments are not limited to the systems, devices, and/or components depicted therein. For example, although system 300 depicts a single computing device for execution of the various computer executable components (e.g., the event extraction component 304, the parsing component 306, the event representation component 308, the clustering component 310, the role labeling component 312, the event generation component 314 and the reference data generation component 316, and additional components described herein), in some embodiments, one or more of the components can be executed by different computing devices (e.g., including virtual machines) separately or in parallel in accordance with a distributed computing system architecture. System 300 (and additional systems described herein) can further comprise various additional computer and/or computing-based elements described herein with reference to operating environment 1200 and FIG. 12. In several embodiments, such computer and/or computing-based elements can be used in connection with implementing one or more of the systems, devices, components, and/or computer-implemented operations shown and described in connection with FIG. 1 or other figures disclosed herein.

In some embodiments, the computing device 302 can be coupled (e.g., communicatively, electrically, operatively, etc.) to one or more external systems, data sources, and/or devices (e.g., the unstructured text corpus 202, the one or more external knowledge bases 218, and/or the structured event schema reference information 324 database, etc.) via a data cable (e.g., coaxial cable, High-Definition Multimedia Interface (HDMI), recommended standard (RS) 232, Ethernet cable, etc.). In other embodiments, the computing device 302 can be coupled (e.g., communicatively, electrically, operatively, etc.) to one or more external systems, sources, and/or devices (the unstructured text corpus 202, the one or more external knowledge bases 218, and/or the structured event schema reference information 324 database, etc.) via a network.

According to multiple embodiments, such a network can comprise wired and wireless networks, including, but not limited to, a cellular network, a wide area network (WAN) (e.g., the Internet) or a local area network (LAN). For example, the computing device 302 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, the computing device 302 can thus include hardware (e.g., a central processing unit (CPU), a transceiver, a decoder), software (e.g., a set of threads, a set of processes, software in execution) or a combination of hardware and software that facilitates communicating information between the computing device 302 and external systems, sources, and/or devices.

The event extraction component 304 can be used in various contexts to extract structured event schema (e.g., structured event schema 100) from unstructured text. For example, in some embodiments, the event extraction component 304 can facilitate the unsupervised event extraction process 200 to generate structured event schema (e.g., structured event schema for the corpus 216) for a corpus of unstructured text (e.g., unstructured text corpus 202). The event extraction component 304 can also facilitate unsupervised event extraction on queries related to the information included in the unstructured text corpus 202.

To facilitate this end, the event extraction component 304 can include parsing component 306, event representation component 308, clustering component 310, role labeling component 312 and event generation component 314.

The parsing component 306 can be configured to parse raw, unstructured text (e.g., the one or more unstructured text documents 204) to identify one or more trigger words (or terms) included in the unstructured text and one or more argument words (or terms) respectively associated with the one or more trigger words. In various embodiments, the parsing component 306 can employ one or more unsupervised machine learning techniques to identify the trigger terms and their arguments as included in raw unstructured text. For example, the parsing component 306 can employ one or more semantic parsing techniques that employ one or more mathematical models configured to understand linguistic meaning in text and perform event schema induction. In various embodiments, this parsing can include AMR parsing. Other suitable parsing techniques for identifying the candidate trigger terms and arguments can include semantic role labeling parsing, dependency parsing, and the like. In this regard, the parsing component 306 can identify the trigger terms and their arguments without using prior knowledge of possible trigger words and their arguments that may be included in the unstructured text. Accordingly, the parsing component 306 can be used to identify trigger terms and their arguments in unstructured text in any domain (e.g., directed to any conceivable topic) without prior knowledge of the possible trigger terms associated with that domain.

Abstract meaning representation (AMR) is a semantic representation language that uses large-scale human annotation of whole-sentence semantic structures in order to build a giant semantics bank (or sembank), of English sentences paired with their whole-sentence, logical meanings. This sembank is referred to as the AMR Bank. The AMR Bank is manually constructed by human annotators. The AMR Bank is a public, open source sembank that can be used by semantic parsers to generate AMRs for whole sentences and phrases.

AMRs represent sentences as single-rooted, directed acyclic graphs, with labeled roles (e.g., determined using a semantic relations database such as PropBank. These graphs are referred to herein as AMR graphs or parse trees. AMR makes extensive use of PropBank framesets. For example, AMR would represent a phrase like "bond investor" using the frame "invest-01", even though no verbs appear in the phrase. Further, AMR is not domain specific about how meanings are derived from strings, or vice-versa. AMR does not require a particular sequence of rule applications or alignments that reflect such rule sequences in translating sentences to AMRs.

The output of AMR parsing can also mark the senses of each predicate in the sentence. In natural language processing (NLP), a "sense" refers to the meaning of a word that is activated by the use of the word in a particular context.

FIG. 4 illustrates three examples of AMR mapping of predicates to senses in accordance with one or more embodiments. These three examples are respectively identified as example 401, example 402, and example 403. Each example mapping involves a predicate, which in example 401 is "operate, proceed", in example 402 is "walk quickly", and in example 403 is cost". In accordance with AMR, each predicate presents annotators with a list of senses that are possible meanings of the predicate as used in a particular context. Each sense has its own definitions for its numbered (core) arguments.

Figure 5A:
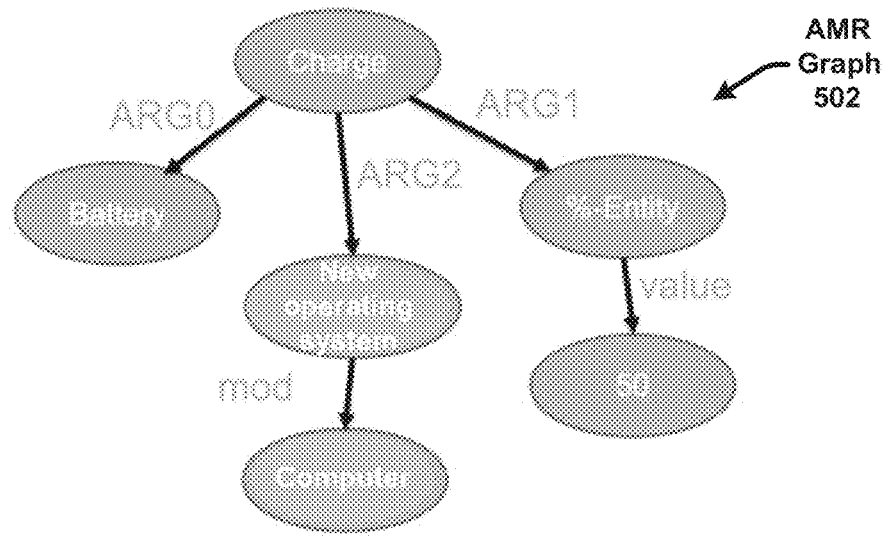
FIGS. 5A and 5B present example AMR graphs representing candidate events extracted from unstructured text in accordance with one or more embodiments.
Figure 5B:
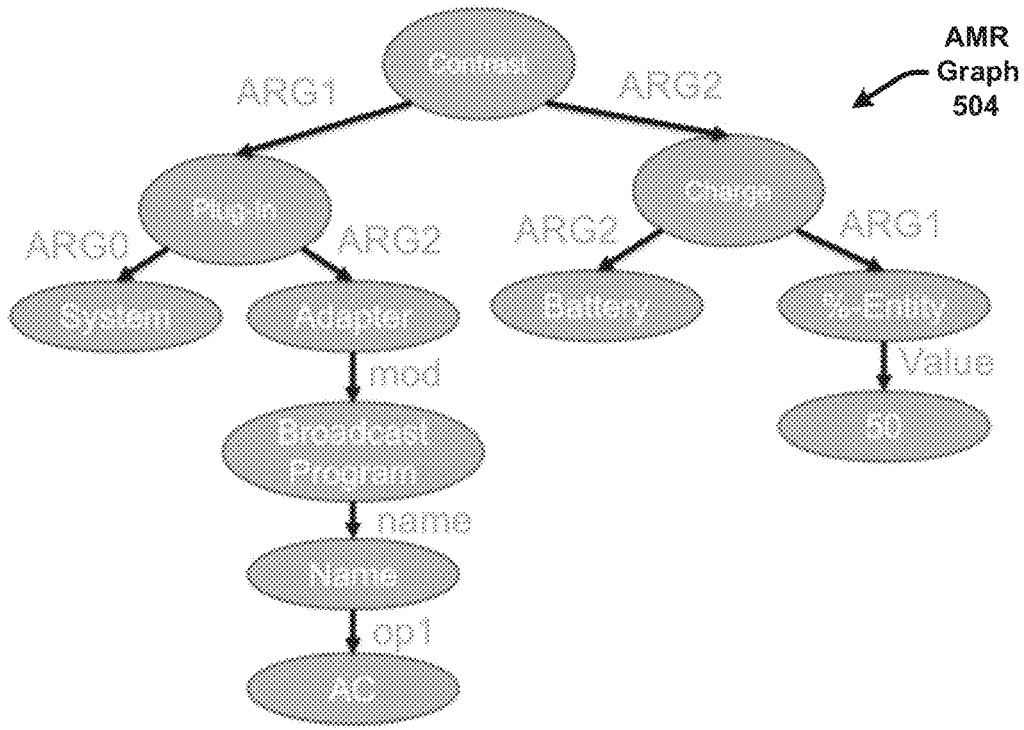

FIGS. 5A and 5B present example AMR graphs representing candidate events extracted from unstructured text using AMR parsing in accordance with one or more embodiments. In this regard, the AMR graphs shown in FIGS. 5A and 5B, (e.g., AMR graph 502 and AMR graph 504, respectively), present example AMR parsing results that can be generated by the parsing component 306 in accordance with one or more embodiments. The AMR graphs can use PENMAN notation which represents a sentence in a simple tree-like form. FIG. 5A presents an example AMR graph 502 that can be generated by the parsing component 306 using AMR parsing based on unstructured input text 501, which states: "The battery does not charge past 50% under the new operating system on my computer". FIG. 5B presents another example AMR graph 504 that can be generated by the parsing component 306 using AMR parsing based on unstructured input text 503, which states: "The system is plugged into AC adapter but the battery won't get charged past 50%."

The AMR graphs include one or more top-level root words that represents the focus of the sentence or phrase. In accordance with the disclosed unsupervised event extraction techniques, the root-word or words correspond to the trigger terms. As shown in FIG. 5A, the root word selected for the unstructured input text 501 is "charge". In various embodiments, the parsing component 306 can identify two or more root-words for a sentence and generate two or more AMR subgraphs for the sentence based on the two or more root words. For example, in some implementations, this can occur when a sentence includes two or more independent clauses. For example, as shown in FIG. 5B, the unstructured input text 503 includes two independent clauses, one being "The system is plugged into the AC adapter," and "The battery won't charge past 50%". In this example, the word "plug-in" is selected for the root-word for the first clause and the word "charge" is selected for the root-word for the second clause. In accordance with the disclosed unsupervised event extraction techniques, the root-words can be or correspond to trigger words/terms.

Once the root term or terms for an AMR have been selected, argument and role labeling is then driven strictly by semantic relations using one or more sembanks (e.g., the AMR Bank, PropBank, and the like). In this regard, the AMR representations break down the unstructured texts sentences into terms considered semantic arguments of the root-word and further identify relevant semantic sub-components associated with the arguments. For example, AMR graph 502 labels three terms as arguments of the root-word "charge", which include the words "Battery", "New operating system", and "%-Entity", respectively labeled as ARG0 (for argument 0), ARG2 (for argument 2), and ARG1 (for argument 1). AMR graph 504 labels two arguments for the root-word "Plug-in", which include "System" and "Adapter", and two arguments for the root-word "Charge", which include "Battery" and "%-Entity".

With reference to FIGS. 3, 5A and 5B, the parsing component 306 can employ one or more AMR parsers or parsing techniques to translate or transform unstructured text sentences or phrases (e.g., included in the one or more unstructured text documents 204) into AMR representations (i.e., AMR graphs such as AMR graph 502 and AMR graph 504) of those sentences. Various types of domain independent and domain specific AMR parsers exist and are continuously being developed and improved. The AMR parser/AMR parsing technique employed by the parsing component 306 to translate unstructured text sentences into AMR representations can vary. For example, the parsing component 306 can employ one or more AMR parsers that employ pre-trained aligners, external semantic resources (e.g., the one or more external knowledge bases 218), and/or data augmentation to generate AMR graphs for unstructured text sentences or phrases.

In various embodiments, the domain independent AMR parsing techniques can employ word sense disambiguation (WSD) and one or more external knowledge bases 218 including one or more sembanks (e.g., WordNet, Babelnet, PropBank, FrameNet, AMR Bank, etc.) to facilitate identifying the trigger term or terms (i.e., the root words) and their arguments. In natural language processing (NLP), WSD refers to the problem of determining which "sense" (meaning) of a word is activated by the use of the word in a particular context. WSD is a natural classification problem. In this regard, given a word and its possible senses, WSD can be used to classify an occurrence of the word in context into one or more of its sense classes. The features of the context (such as neighboring words) provide the evidence for classification. Typically, there are two kinds of approaches for WSD: supervised, which make use of sense-annotated training data; and unsupervised or knowledge-based, which makes use of the properties of sembanks. The parsing component 306 can employ supervised WSD, unsupervised WSD, or a combination thereof.

In one or more embodiments, for an identified sentence (or phrase) in the unstructured text input, or for an entire document or a collection of documents, the parsing component 306 can consider all noun and verb concepts that are assigned a sense by WSD as candidate event triggers. The parsing component 306 can also classify any remaining concepts that match both a verbal and a nominal lexical unit in the FrameNet corpus as candidate event triggers. The parsing component 306 can further employ the semantic relations defined in one or more sembanks (e.g., the AMR Bank or the like) to identify the arguments. For example, in some embodiments, for each candidate event trigger, the parsing component 306 can select a subset of all AMR relations to identify the event arguments. The parsing component 306 can further generate AMRs (e.g., AMR graphs) for each (or in some implementations one or more) extracted event (e.g., AMR graphs). Using this method, the parsing component 306 can identify one or more trigger words in a sentence and potential arguments for each trigger word. In this regard, each identified trigger term and its' one or more arguments corresponds to an extracted event. As exemplified in FIG. 5B, some sentences or phrases can have two or more extracted events.

Referring back to FIG. 3, the event representation component 308 and the clustering component 310 can facilitate assigning an event type to each (or in some implementations one or more) extracted event. In this regard, all of the AMR graphs (or parse trees) generated for all extracted events associated with a single sentence, a single paragraph, a single document, a set of related documents (e.g., the one or more unstructured text documents 204), and/or an entire corpus (e.g., the unstructured text corpus 202), are naturally linked together because of the structure of the candidate events and arguments. The event extraction component 304 can use graph embeddings to identify clusters of subgraphs inside of larger graphs to generate clusters of different events types. In this regard, the event representation component 308 can be configured to generate event representations for the extracted events using graph embeddings. The clustering component 310 can then employ the event representations to cluster the events into different event types.

For example, to classify an extracted event with a specific event type, the event representation component 308 utilizes the embedding for each term containing the information of its context in the sentence (i.e., the surrounding nodes in the parse tree). Because AMR representations have a graph-like structure, the event representation component 308 can employ one or more graph neural networks to generate the embeddings. In accordance with these embodiments, the event representation component 308 can generate an adjacency matrix for the AMRs based on the number of nodes, wherein the adjacency matrix can be represented by N×N, wherein N is number of nodes). Additionally, or alternatively, the event representation component 308 can generate a feature matrix for the AMRs, wherein the feature matrix can be represented by N×F, wherein F is the number of features. The event representation component 308 can further employ the adjacency matrix and/or the feature matrix as input to the one or more graph neural networks to generate an embedding matrix as output, wherein the embedding matrix is represented as N×V, and wherein V is the embedding size. The event representation component 308 can further use one or more variational graph auto-encoders for unlabeled data.

In some embodiments, the event representation component 308 can generate a single graph embeddings representation that is a superset of all AMR nodes for all extracted events, such as all extracted events included the unstructured text corpus 202, (or a selected subset of the events). In other embodiments, the event representation component 308 can generate multiple graph embeddings for each AMR (wherein each AMR corresponds to one or more events). The clustering component 310 can further cluster the events into different event types based on the graph embeddings using one or more clustering algorithms/techniques. For example, some suitable clustering algorithms/techniques can include but are not limited to: centroid-based clustering (e.g., k-means clustering), density-based clustering, distribution based clustering (e.g., Gaussian distribution clustering), and hierarchical clustering. Table 1 provides some example event types in the information technology (IT) support domain that can be generated as a result of clustering in accordance with one or more embodiments described herein.

TABLE 1

| Event Type | Examples |
| --- | --- |
| Online | Update (By signing in, you can easily manage and customize your preference and update your profile.) Search, Chat |
| Hardware | Display Operate Recover |
| Basic Tech | Drag, Drop, Support |
| Tutorials | Download (Software download) |
| Permissions | Trademark, Allow, Register (Registered User) |
| Operating System | Update (Then OS begins to search for the latest updates for your computer.) Support |

Table 1 provides five different example types of IT events that were identified using the techniques described above as applied to an IT corpus of troubleshooting documents. It should be appreciated that various additional event types can be identified and those shown in Table 1 merely provide some example types. The event types shown in Table 1 also include some examples of the kinds of IT events that can be associated with the different event types.

With reference again to FIG. 3, once the trigger terms and their one or more arguments have been identified, the role labeling component 312 can label the argument roles. In particular, for each (or in some implementations one or more) trigger term, the role labeling component 312 can determine the roles that the trigger word's argument(s) have relative to the trigger word in the context of the sentence or phrase from which they were derived (e.g., the roles of supplier and recipient for the AC adapter and the battery respectively in the example described above with reference to box 101). In various embodiments, role labeling component can employ one or more external knowledge bases 218 that provide domain independent semantics information to determine the argument roles. For example, some suitable external knowledge bases that can be used by the role labeling component 312 include FrameNet, VerbNet, ProbBank and the like. The role labeling component 312 can employ these external knowledge bases to map trigger words and AMR arguments/roles to argument roles in the final, structured event schema. In some implementations, in association with labeling argument roles, the role labeling component 312 can further refine the candidate argument terms. In particular, the role labeling component can consolidate AMR identified argument terms and/or related components into a unified argument based on the roles associated with each term as provided in the external knowledge bases 218. Table 2 presents an example of argument role labeling using PropBank semantics information.

TABLE 2

- Example
  - plug        plug.04 - ##        put plug in socket, non-phrasal
  - ARG0      PropBank: plugger
  - ARG1      PropBank: (thing with) plug
  - ARG2      PropBank: socket
  - restart      restart.01 - ##        to start again or anew
  - ARG0      PropBank: starter, agent
  - ARG1      PropBank: entity restarted In an extracted event a trigger term is an action taking place in the event and arguments are the entities involved in the event. Each argument is also labeled with an argument role that describes its involvement in the event. In the example shown in Table 2, two trigger terms are provided which include "plug" and "restart". The possible PropBank arguments/roles associated with each of these trigger terms are further provided below the respective argument terms. For example, ARG0, ARG1, ARG2 of Table 2, etc., respectively correspond to PropBank arguments/roles. In accordance with this example, the role labeling component 312 can use the possible PropBank provided arguments/roles to determine the most appropriate role of an argument term relative to its trigger word.

With reference again to FIG. 3, in various embodiments, the event generation component 314 can generate the final structured event schema for respective events identified and extracted using the techniques described above. In this regard, for each (or, in some implementations, one or more) trigger word, the event generation component 314 can generate structured event schema that defines an event by the trigger word, its' arguments, its argument roles, and provides its event type.

Figure 6A:
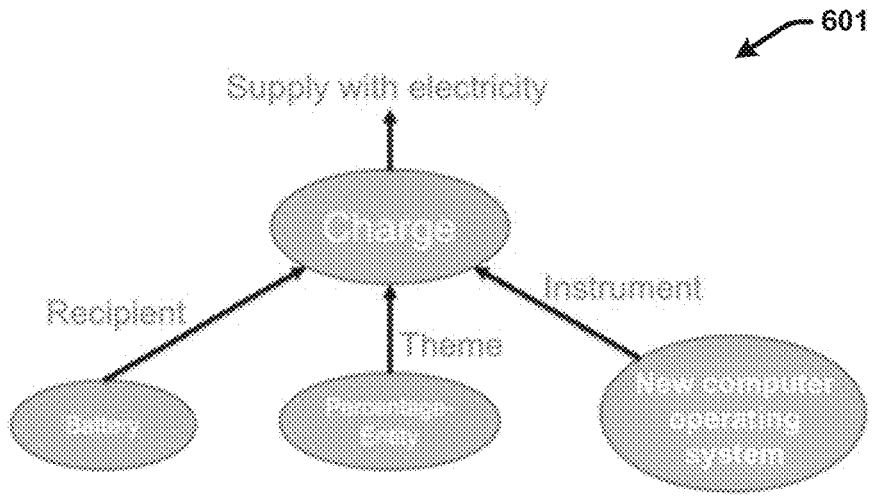
FIGS. 6A and 6B present example AMR graphs representing the final results of unsupervised event extraction in accordance with one or more embodiments.
Figure 6B:
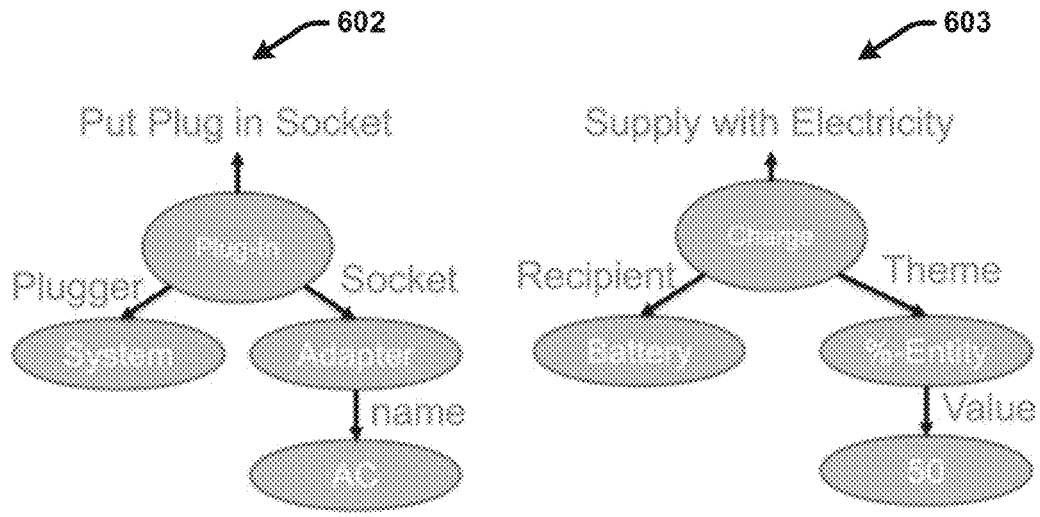

FIGS. 6A and 6B present example structured event schema graphs representing the final results of unsupervised event extraction in accordance with one or more embodiments. FIG. 6A presents a graph 601 that can be generated by the event generation component 314 that corresponds structured event schema for unstructured input text 501. FIG. 6B presents two graphs, graph 602 and graph 603, that can be generated by the event generation component 314 that corresponds structured event schema for unstructured input text 503.

With reference to FIGS. 5A and 6A, as can be seen by comparison of the AMR graph 502 with graph 601 representing the final event schema for unstructured input text 501, the final event schema includes a more streamlined graph that identifies the trigger term ("charge"), its arguments ("battery", "percentage-entity", and "new computer operating system"), and the roles of these components (i.e., supply with electricity, recipient, them and instrument, respectively).

Similarly, with reference to FIGS. 5B and 6B, as can be seen by comparison of the AMR graph 504 with graph 602 and graph 603 representing the final event schema for unstructured input text 503, the final event schema defines two events for the unstructured input text 503, one for the trigger term "plug-in" and another for the trigger term "charge". The final event schema for both of these events also include more streamlined graphs that identify the trigger terms, their arguments, the roles of these components. For example, with reference to graph 602, one event is defined by the trigger term "plug-in", two-arguments; "system", "adapter", and their roles: "ARG0 (plugger)", and "ARG2 (socket)" respectively. With reference to graph 603, the other event is defined by the trigger term "charge", two-arguments; "battery", "%-entity" and their roles respectively.

With reference again to FIG. 3 in view of FIG. 2, in various embodiments, system 300 can be used to generate structured event schema for a corpus of related documents (identified as the structured event schema for the corpus 216), as described with reference to unsupervised event extraction process 200. With these embodiments, the structured event schema for the corpus can include structured event schema defining all (or in some implementations one or more) events extracted from unstructured text documents 204 for the unstructured text corpus 202. For example, the structured event schema for the corpus 216 can define hundreds to thousands of events represented by their four components (e.g., their trigger term, their arguments, their argument roles, and their event type). In some implementations of these embodiments, the structured event schema for the corpus 216 can be used to facilitate answering user queries related to the unstructured text corpus by reasoning on events using reference information that associates respective parts of the unstructured text corpus with their corresponding structured event schema. In system 300, this information is referred to as structured event schema reference information 324. With these implementations, the computing device 302 can include reference data generation component 316 to generate the structured event schema reference information 324.

For example, in various embodiments, the reference data generation component 316 can generate a separate file or database that identifies the specific part (or parts) of the unstructured text corpus 202 associated with each extracted event defined in the structured event schema for the corpus 216 by structured event schema. The specific part or parts can include for example, a specific sentence, a specific excerpt, a specific paragraph, a specific document, a specific section, etc. Additionally, or alternatively, the reference data generation component 316 can annotate the unstructured text corpus 202 with structured event schema. For example, the reference data generation component 316 can annotate respective parts of the unstructured text corpus 202 with event schema defining the event or events associated with the respective parts. For example, in an example in which the unstructured text corpus 202 includes a plurality of troubleshooting documents directed to different IT problems, the reference data generation component 316 can annotate the different documents/excerpts with structured event schema defining the events (e.g., IT issues) that are described in each document/excerpt. After the structured event schema reference information 324 has been generated, it can be used to answer user queries by reasoning using events, as now described with reference to FIGS. 7-9.

Figure 7:
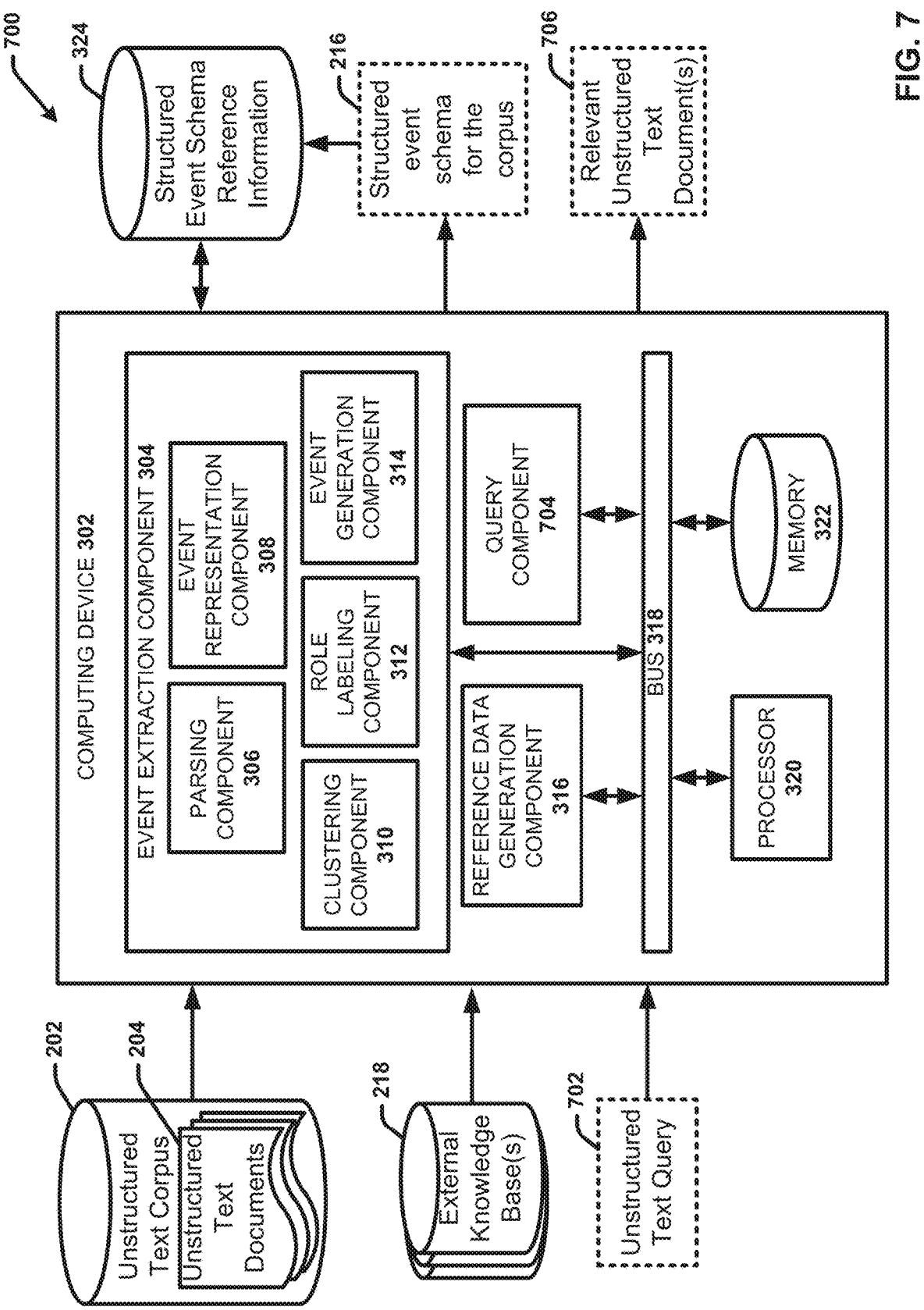
FIG. 7 illustrates a block diagram of an example, non-limiting system that facilitates responding to unstructured text queries using unsupervised event extraction in accordance with one or more embodiments.

FIG. 7 illustrates a block diagram of an example, non-limiting system 700 that facilitates responding to unstructured text queries using unsupervised event extraction in accordance with one or more embodiments. System 700 is similar to system 300 with the addition of query component 704 to the computing device 302. Repetitive description of like elements employed in respective embodiments is omitted for sake of brevity.

In various embodiments, the query component 704 can receive unstructured text queries (e.g., an unstructured text query 702) for which the responses may be provided in an unstructured text corpus (e.g., unstructured text corpus 202) that has structured event schema reference information 324 associated therein. For instance, in some example implementations in which the unstructured text corpus 202 includes IT support information directed to various IT support topics/issues, the query component 704 can receive user queries directed to IT support issues. In one example, with reference to FIGS. 6A and 7, the unstructured text query 702 can be or correspond to unstructured input text 501, which states, "The battery does not charge past 50% under the new operating system on my computer".

The query component 704 can further employ the event extraction component 304 to convert an unstructured user query into structured query event schema using the same (or similar) unsupervised event extraction process used to generate the structured event schema for the corpus 216. For example, with reference again to FIGS. 6A and 7, the query component 704 can employ or otherwise direct the event extraction component 304 to generate the structured event schema represented by graph 601. In this regard, the query component 704 can receive structured query event schema from the event extraction component 304 for the unstructured text query 702. The structured query event schema can define one or more events extracted for the unstructured text query, wherein each event is defined by the four event components (i.e., a trigger word, one or more arguments, the argument roles, and the event type). The query component 704 can then screen the query event schema against the structured event schema reference information 324 to identify one or more related events defined therein based on having same or similar event components. For example, the query component 704 can generate similarity scores for potential related events that reflect the degree of similarity between their structured event schema and the structured query event schema (e.g., as a percentage match or using another suitable scoring metric). The query component 704 can further select the related event that has the highest similarity score and/or one or more related events that have a similarity score above a defined threshold (e.g., a 90% match or greater).

The query component 704 can further employ the portion or portions (e.g., a specific sentence, a specific excerpt, a specific paragraph, a specific document, a specific section, etc.) of the unstructured text corpus 202 corresponding to the related event or events to answer or otherwise respond to the query. For example, in the embodiment shown in system 700, the query component 704 can identify one or more of the unstructured text documents 204 that are associated with same or similar structured event schema and provide the user with the one or more relevant unstructured text documents 706 (or links to the documents). For example, with reference to FIGS. 6A and 6B, in one example, the unstructured input text 503 can be or correspond to unstructured text of a document or portion of a document included in the IT corpus, and the unstructured text query 702 can corresponds to unstructured input text 501. According to this example, the query component 704 can determine that the structured event schema of graph 603 has substantial degree (e.g., relative to a threshold degree) of similarity to the structured event schema of graph 601 based on their similar event components. The query component 704 can thus select and provide the document or portion of the document including the unstructured input text 503 in response to the received user query. The query component 704 can employ various mechanism to evaluate and score event schema similarity based on their event components.

In some implementations in which two or more relevant portions of the unstructured text corpus 202 are identified, the query component 704 can rank the relevant portions based on degree of correspondence between their event components (e.g., using their similarity scores), wherein the greater the degree of correspondence, the higher the ranking.

Figure 8:
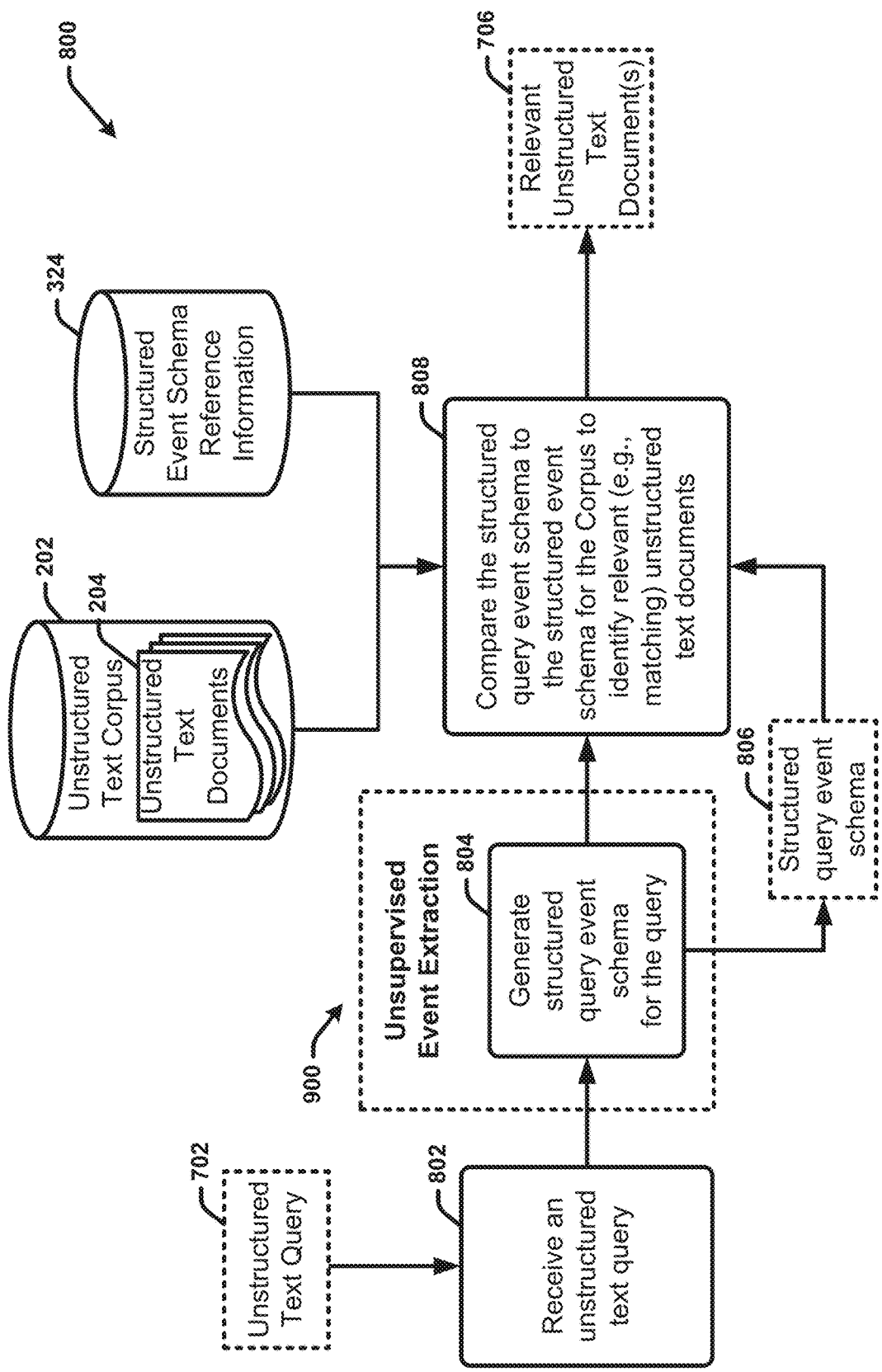
FIG. 8 illustrates a flow diagram of an example, non-limiting computer-implemented method for responding to unstructured text queries using unsupervised event extraction in accordance with one or more embodiments.

FIG. 8 illustrates a flow diagram of an example, non-limiting computer-implemented method 800 for responding to unstructured text queries using unsupervised event extraction in accordance with one or more embodiments. Method 800 provides an example process that can be performed by system 700 using the query component 704 and the event extraction component 304 in accordance with one or more embodiments. Repetitive description of like elements employed in respective embodiments is omitted for sake of brevity.

In accordance with the method at 802, a system operatively coupled to a processor (e.g., system 700), can receive an unstructured text query 702. For example, the unstructured text query 702 can include a question, a statement, a phrase or the like. At 804, the system can generate structured query event schema 806 for the query using the unsupervised event extraction techniques described herein. Additional details regarding the unsupervised event extraction process 900 that can be used to generate the structured query event schema 806 are described with reference to FIG. 9. At 808, the system can compare the structured query event schema to the structured event schema for the corpus (e.g., as provided by the structured event schema reference information 324) to identify one or more of the unstructured text documents 104 included in the corpus that are relevant to the unstructured text query 702. The system can further provide the one or more relevant unstructured text documents 706 (or links to the documents) in response to the query. In the embodiment shown, the structured event schema reference information 324 is shown in a separate data structured from the unstructured text corpus 202. However, it should be appreciated that the structured event schema reference information 324 can be included in the unstructured text corpus. For example, in some implementations, the unstructured text documents 204 can be annotated with structured event schema corresponding to the events associated therewith. In another implementation, the unstructured event schema can be incorporated as metadata.

Figure 9:
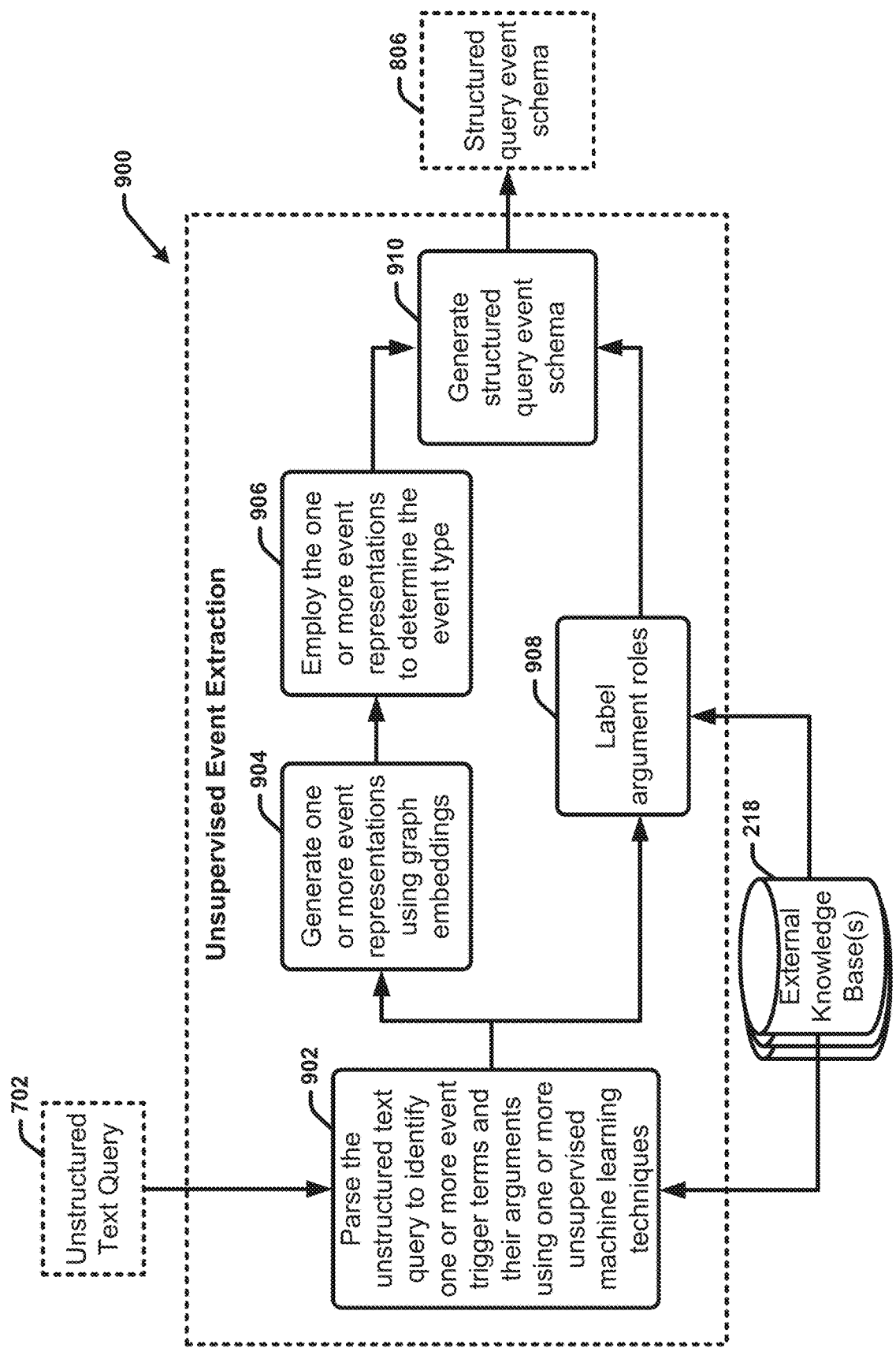
FIG. 9 illustrates a flow diagram of another example, non-limiting unsupervised event extraction process in accordance with one or more embodiments.

FIG. 9 illustrates a flow diagram of another example, non-limiting, unsupervised event extraction process 900 in accordance with one or more embodiments. In various embodiments, the unsupervised event extraction process 900 can be used to generate structured event schema for unstructured text queries (e.g., unstructured text query 702) and/or similar small data inputs (e.g., including of one or few phrases/sentences). Repetitive description of like elements employed in respective embodiments are omitted for sake of brevity.

In this regard, at 902 a system operatively coupled to a processor (e.g., system 700 or the like), can receive an unstructured text query 702 and parse the unstructured text query to identify one or more event trigger terms and their arguments using one or more unsupervised machine learning techniques (e.g., using the parsing component 306). At 904, the system can generate one or more event representations for the trigger terms and arguments using graph embeddings (e.g., using event representation component 308). At 906, the system can employ the one or more event representations to determine the event type (e.g., using clustering component 310). In this regard, the system can determine the type of event represented by the query. In implementations in which the query is associated with two or more events, the system can also determine the event type for each event. At 908, the system can label the argument roles (e.g., using role labeling component 312). Finally, at 910, the system can generate the structured query event schema 806.

Figure 10:
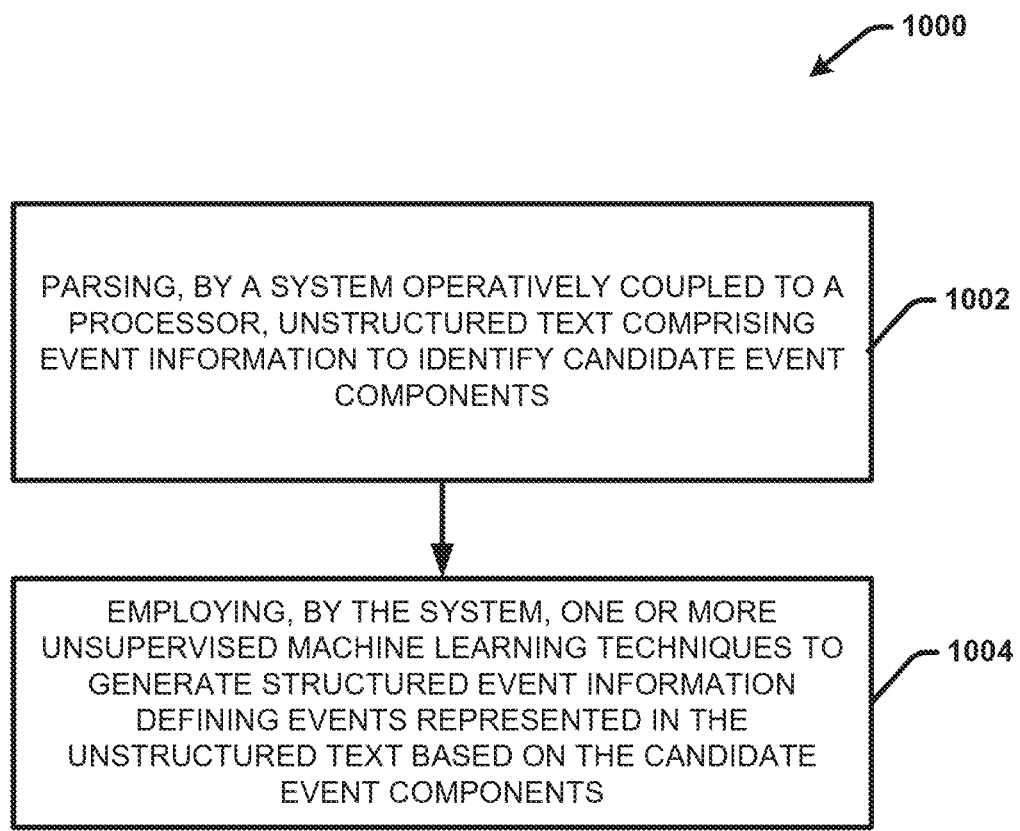
FIG. 10 illustrates a high-level flow diagram of an example, non-limiting computer-implemented method for performing unsupervised event extraction in accordance with one or more embodiments.

FIG. 10 illustrates a high-level flow diagram of an example, non-limiting computer-implemented method 1000 for performing unsupervised event extraction in accordance with one or more embodiments. Repetitive description of like elements employed in respective embodiments are omitted for sake of brevity.

At 1002, a system operatively coupled to a processor (e.g., system 300, system 700, or the like), parses unstructured text comprising event schema to identify candidate event components (e.g., using parsing component 306). In various embodiments, the candidate event components include one or more trigger terms and one or more arguments for the candidate trigger terms. At 1004, the system can further employ one or more unsupervised machine learning techniques to generate structured event information (e.g., structured event schema for the corpus 216 and/or structured query event schema 806) defining events represented in the unstructured text based on the candidate event components (e.g., using event representation component 308, clustering component 310, role labeling component 312 and/or event generation component 314).

Figure 11:
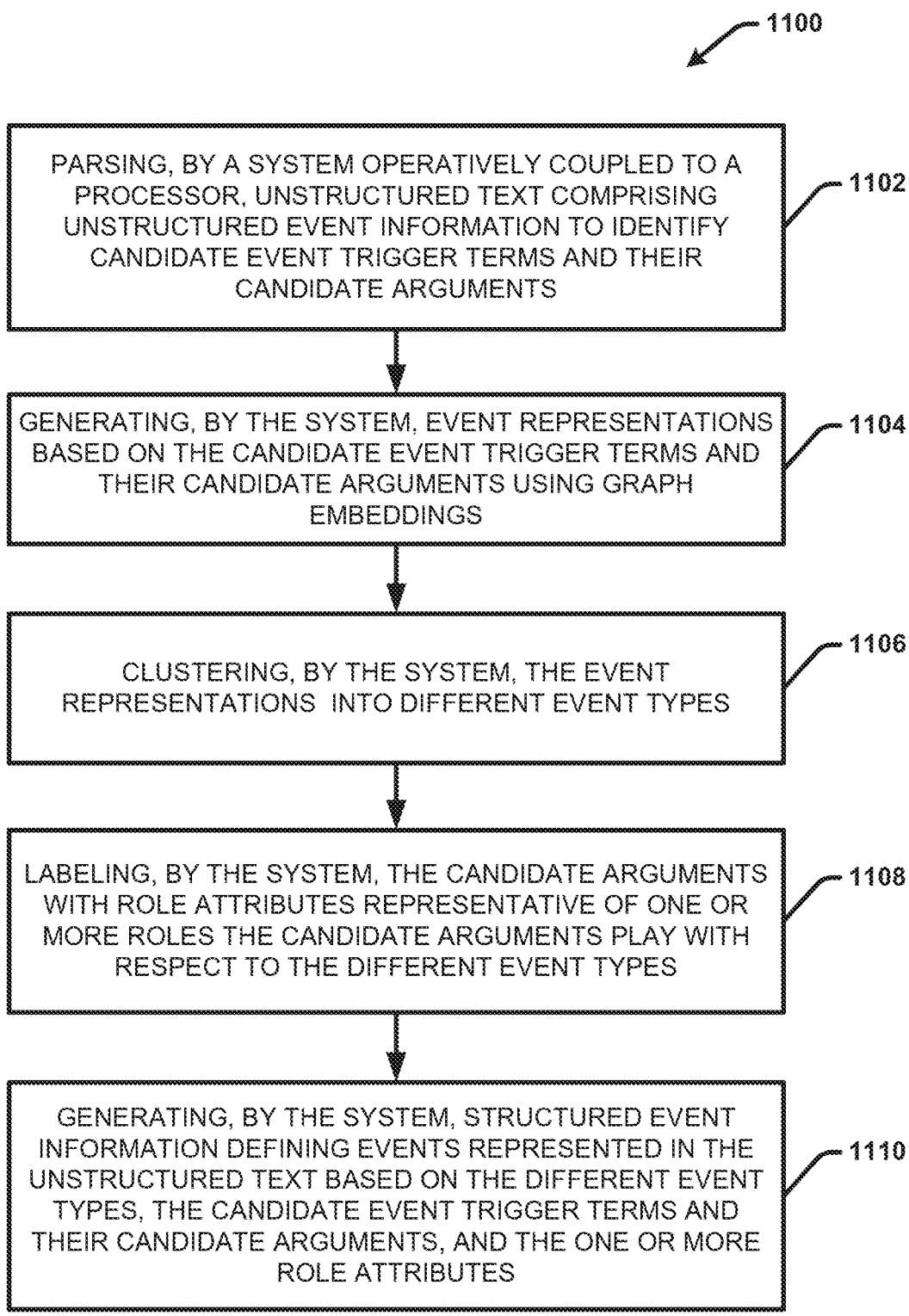
FIG. 11 illustrates a high-level flow diagram of another example, non-limiting computer-implemented method for performing unsupervised event extraction in accordance with one or more embodiments.

FIG. 11 illustrates a high-level flow diagram of another example, non-limiting computer-implemented method 1100 for performing unsupervised event extraction in accordance with one or more embodiments. Repetitive description of like elements employed in respective embodiments are omitted for sake of brevity.

At 1102, a system operatively coupled to a processor (e.g., system 300, system 700, or the like), parses (e.g., using parsing component 306) unstructured text comprising event information to identify candidate event trigger terms and their arguments (e.g., wherein each candidate event trigger term can have one or more arguments). At 1104, the system generates event representations based on the candidate event trigger terms and their arguments using graph embeddings (e.g., using event representation component 308). At 1106, the system can cluster the event representations into different event types (e.g., using clustering component 310). At 1108, the system can label the candidate event arguments with role attributes representative of one or more rules the candidate arguments play with respect to the different event types (e.g., using role labeling component 312). At 1110, the system can generate structured event information (e.g., structured event schema for the corpus 116 and/or structured query event schema 806) defining events represented in the unstructured text based on the different event types, the candidate event trigger terms and their candidate arguments, and the one or more role attributes (e.g., using event generation component 314).

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
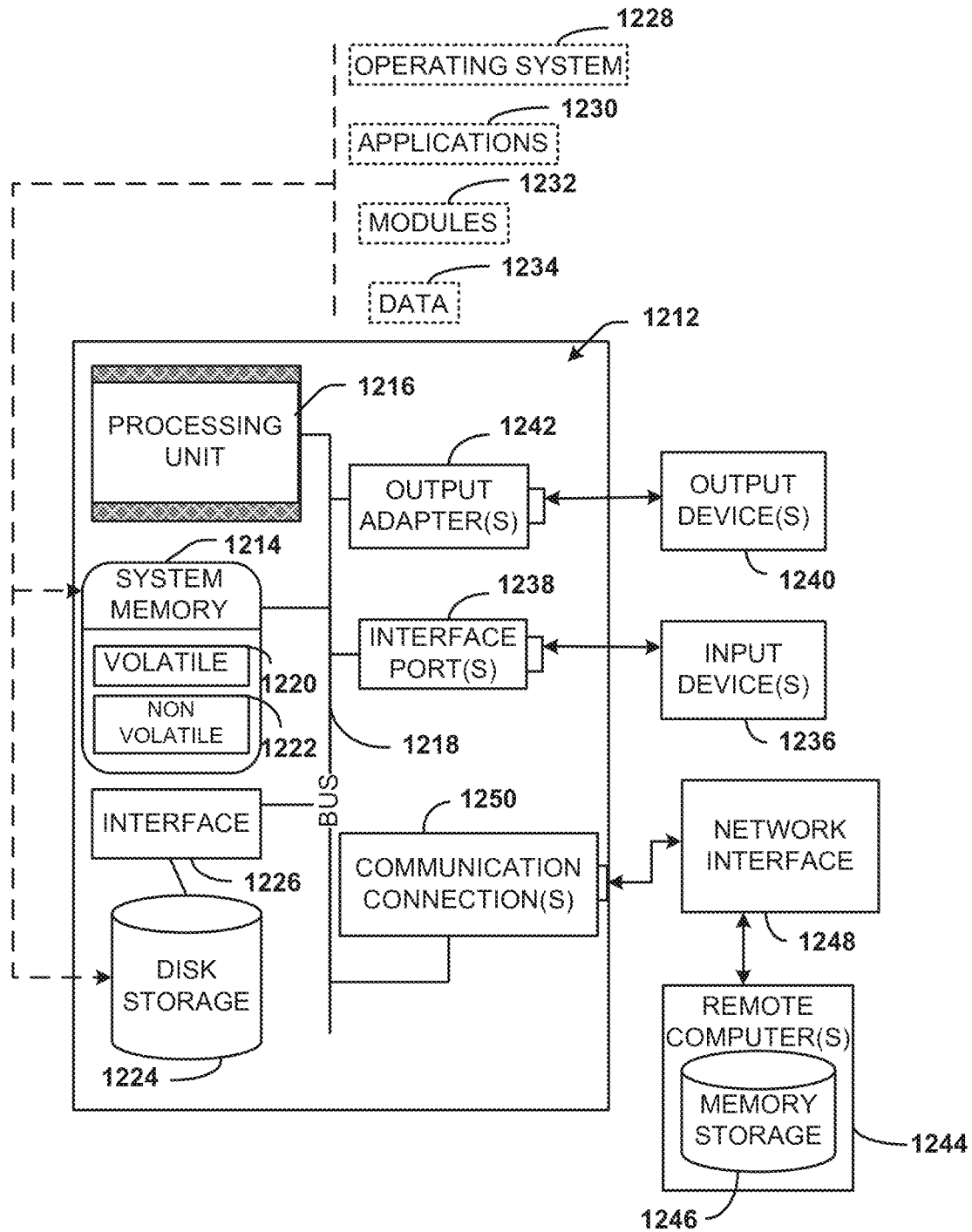
FIG. 12 illustrates a block diagram of an example, non-limiting operating environment in which one or more embodiments described herein can be facilitated.

FIG. 12 can provide a non-limiting context for the various aspects of the disclosed subject matter, intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the users computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing machine learning and artificial intelligence to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes the computer executable components stored in the memory, wherein the computer executable components comprise:
      a parsing component that identifies candidate event components included in a corpus of unstructured text data using one or more unsupervised machine learning processes; and
      an event extraction component that generates structured event information defining different events represented in the corpus of unstructured text data based on the candidate event components.

2. The system of claim 1, wherein the structured event information defines respective events of the different events using a trigger term, one or more argument terms, one or more roles of the arguments and an event type.

3. The system of claim 1, wherein the candidate event components comprise candidate event trigger terms and candidate event arguments respectively associated with the candidate event trigger terms.

4. The system of claim 1, wherein the computer executable components further comprise:
   an event representation component that generates event representations using graph embeddings based on the candidate event components.

5. The system of claim 4, wherein the candidate event components comprise candidate event trigger terms and candidate event arguments respectively associated with the candidate event trigger terms, and wherein the event representations comprise an event representation for each of the candidate event trigger terms.

6. The system of claim 4, wherein the computer executable components further comprise:
   a clustering component that employs the event representations to cluster the candidate event components into different event types.

7. The system of claim 6, wherein the event extraction component generates the structured event information based on the different event types and the candidate event components respectively grouped with the different event types.

8. The system of claim 6, wherein the candidate event components comprise candidate event trigger terms and candidate event arguments respectively associated with the candidate event trigger terms, and wherein the computer executable components further comprise:
   a role labeling component that labels the candidate event arguments with one or more role attributes representative of roles the candidate event arguments play with respect to the different event types, wherein the event extraction component generates the structured event information based on the different event types, the candidate event trigger terms respectively associated with the different event types, the candidate event arguments respectively associated with the candidate event trigger terms, and the role attributes.

9. The system of claim 8, wherein the role labeling component employs one or more external knowledge bases to facilitate labeling the candidate event arguments with the one or more role attributes.

10. The system of claim 1, wherein the unsupervised machine learning processes comprise abstract meaning representation parsing.

11. The system of claim 3, wherein the computer executable components further comprise:
    a role labeling component that employs external knowledge bases to label the candidate event arguments with role attributes representative of one or more roles the candidate event arguments play with respect to the candidate event trigger terms.

12. The system of claim 1, wherein the computer executable components further comprise:
    a query component that receives a query request regarding an event and employs the structured event information to identify parts of the unstructured text data that are relevant to the query request.

13. A method, comprising:
    identifying, by a system operatively coupled to a processor candidate event components included in a corpus of unstructured text data using unsupervised machine learning processes; and
    generating, by the system, structured event information defining different events represented in the corpus of unstructured text data based on the candidate event components.

14. The method of claim 13, wherein the candidate event components comprise candidate event trigger terms and candidate event arguments respectively associated with the candidate event trigger terms.

15. The method of claim 13, further comprising:
    generating, by the system, different event representations based on the candidate event components and using graph embeddings.

16. The method of claim 15, further comprising:
    employing, by the system, the different event representations to cluster the candidate event components into different event types.

17. The method of claim 16, wherein the candidate event components comprise candidate event trigger terms and candidate event arguments respectively associated with the candidate event trigger terms, and wherein the method further comprises:

labeling, by the system, the candidate event arguments with role attributes representative of roles the candidate event arguments play with respect to the different event types, and wherein the generating comprises generating the structured event information based on the different event types, the candidate event trigger terms respectively associated with the different event types, the candidate event arguments respectively associated with the candidate event trigger terms, and the role attributes.

18. The method of claim 13, wherein the one or more unsupervised machine learning processes comprise abstract meaning representation parsing.

19. A computer program product for unsupervised event extraction, the computer program product comprising a computer readable storage medium having program instructions embodied therewith, the program instructions executable by a processing component to cause the processing component to:

identify candidate event components included in a corpus of unstructured text data using unsupervised machine learning processes; and generate structured event information defining different events represented in the corpus of unstructured text data based on the candidate event components.

20. The computer program product of claim 19, wherein the candidate event components comprise candidate event trigger terms and candidate event arguments respectively associated with the candidate event trigger terms, and wherein the program instructions executable further cause the processing component to:

generate event representations based on the candidate event trigger terms and the candidate event arguments using graph embeddings;

employ the event representations to cluster the event representations into different event types;

label the candidate event arguments with role attributes representative of one or more roles the candidate event arguments play with respect to the different event types; and generate the structured event information based on the different event types, the candidate event trigger terms respectively associated with the different event types, the candidate event arguments respectively associated with the candidate event trigger terms, and the one or more role attributes.

* * * * *